Figure 1:
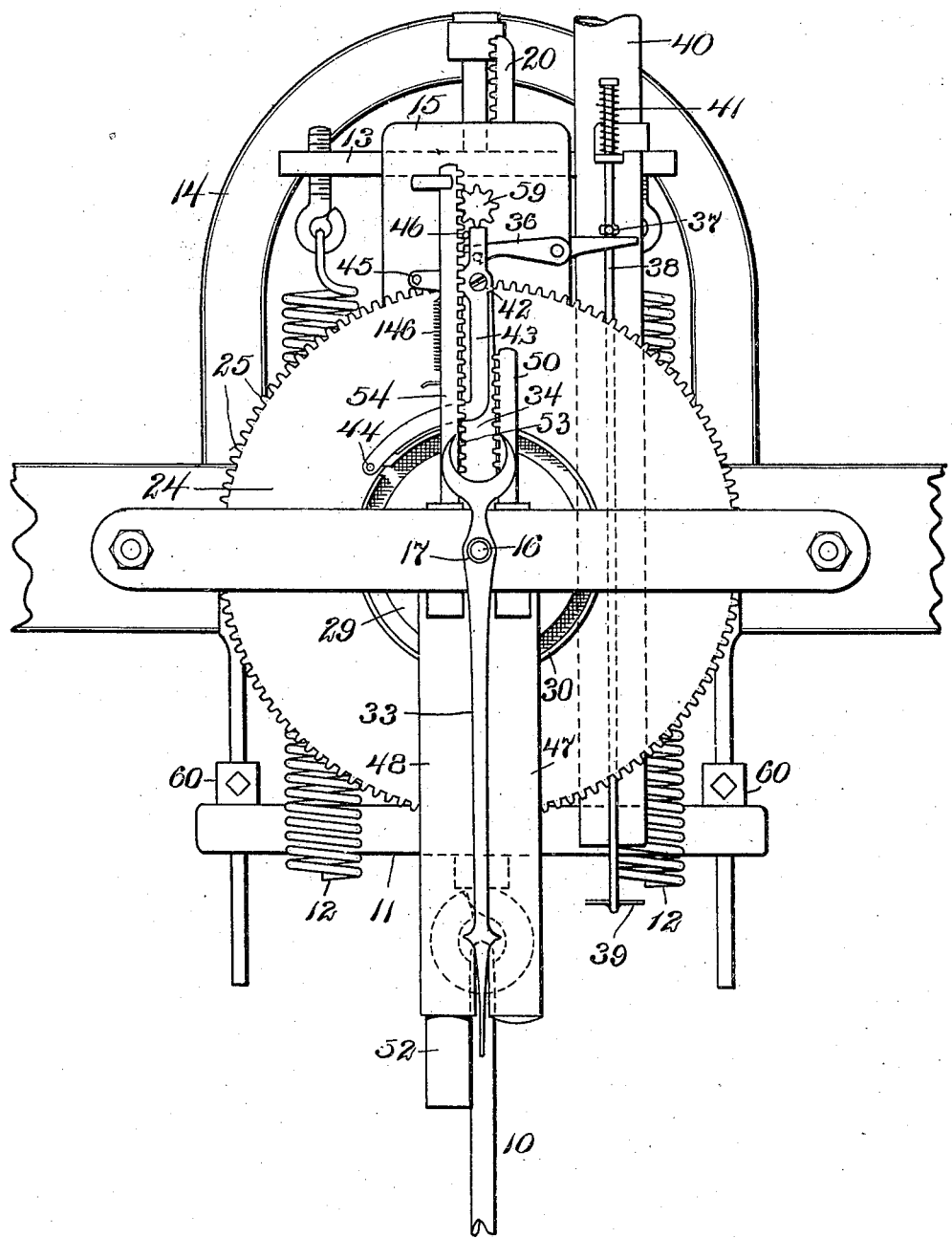

No. 836,926. PATENTED NOV. 27, 1906.
C. J. HARRINGTON.
COIN CONTROLLED WEIGHING MACHINE.
APPLICATION FILED APR. 14, 1904.

3 SHEETS—SHEET 1.

Witnesses:
P. W. Pezzetti
A. C. Ratigan

Inventor:
C. J. Harrington,
by Wright, Brown & Quinby
his Attys.

No. 836,926. PATENTED NOV. 27, 1906.
C. J. HARRINGTON.
COIN CONTROLLED WEIGHING MACHINE.
APPLICATION FILED APR. 14, 1904.
3 SHEETS—SHEET 2.
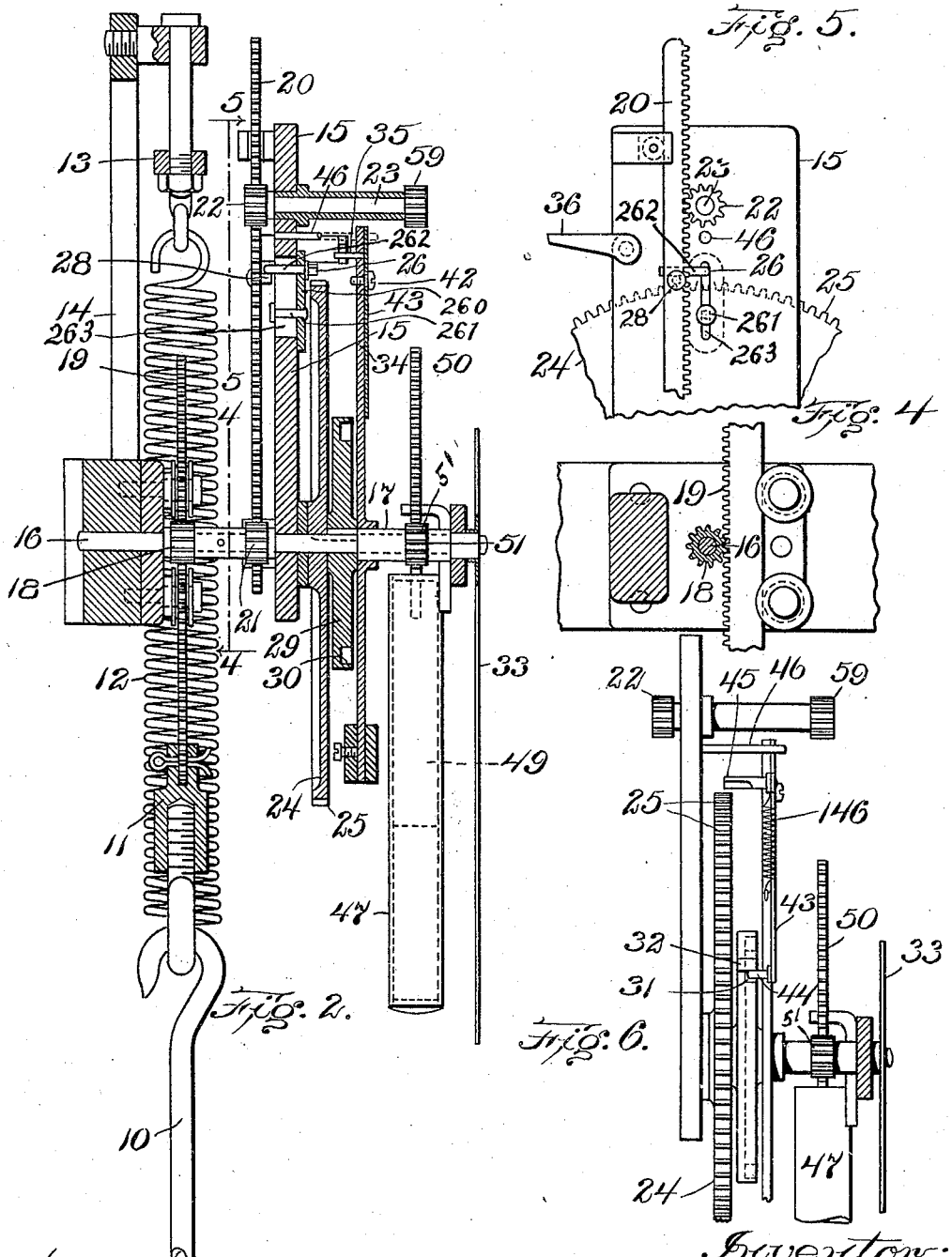

No. 836,926. PATENTED NOV. 27, 1906.
C. J. HARRINGTON.
COIN CONTROLLED WEIGHING MACHINE.
APPLICATION FILED APR. 14, 1904.
3 SHEETS—SHEET 3.
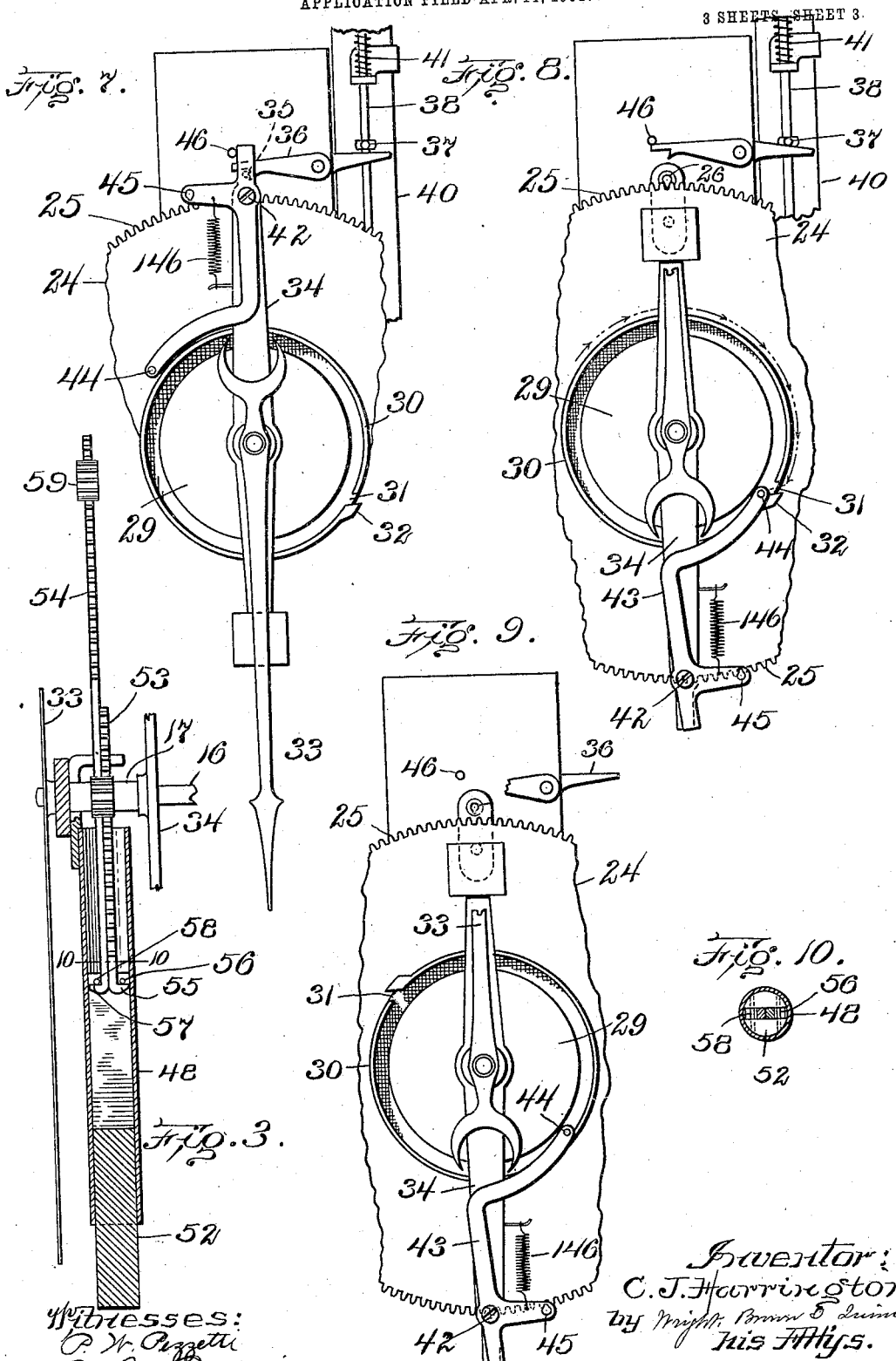

UNITED STATES PATENT OFFICE.

CORNELIUS J. HARRINGTON, OF BOSTON, MASSACHUSETTS, ASSIGNOR OF ONE-HALF TO WILLIAM F. WILLS, OF BOSTON, MASSACHUSETTS.

COIN-CONTROLLED WEIGHING-MACHINE.

No. 836,926.     Specification of Letters Patent.     Patented Nov. 27, 1906.

Application filed April 14, 1904. Serial No. 203,147.

*To all whom it may concern:*

Be it known that I, CORNELIUS J. HARRINGTON, of Boston, in the county of Suffolk and State of Massachusetts, have invented certain new and useful Improvements in Coin-Controlled Weighing-Machines, of which the following is a specification.

Of the accompanying drawings, Figure 1 represents a front elevation of a weighing-machine embodying my invention. Fig. 2 represents a transverse vertical section. Fig. 3 represents a section showing the hand-returning devices. Fig. 4 represents a section on line 4 4 of Fig. 2. Fig. 5 represents a rear elevation looking from the plane 5 5 of Fig. 2, showing principally the device for holding the hand-locking wheel when an object is being weighed. Fig. 6 represents a left-hand side elevation of certain parts. Fig. 7 represents a front elevation of the hand, its locking mechanism, and related parts after weighing has been performed, but before the coin is inserted and the weight indicated. Fig. 8 represents a similar view showing the position of parts after the weight has been indicated. Fig. 9 represents a similar view showing the position of parts after the weight has been removed from the platform and before the hand has returned to initial position. Fig. 10 represents a section on line 10 10 of Fig. 3.

The same reference characters indicate the same parts in all the figures.

This invention relates particularly to that class of coin-controlled weighing-machines in which the weighing of an object is performed as soon as the weight is placed on the platform, but is not indicated until a coin has been deposited.

It is the object of the invention to provide an improved type of machine of this class in which many of the objections to former types are disposed of, and the particular improvements consist in certain devices whereby the hand or other indicator is freed from the weighing mechanism at all times except at the moment when the hand reaches a position corresponding to the position which the weighing mechanism has assumed under the influence of a weight placed upon the platform and when in such position is locked, thereby preventing the attainment of false results or of more than the number of weights designed to be indicated on one coin.

In the embodiment selected for illustration the weighing-platform and balances, of the usual or any suitable character, and hence not shown, are connected by a rod 10 with a vertically-movable cross-head 11, attached by springs 12 12 with a stationary cross-head 13, suspended from a frame 14, which is mounted in the casing of the machine. This frame includes a plate 15, Fig. 2, giving support to many of the parts.

16 is a central arbor, on the forward end of which is mounted a loose sleeve 17. The arbor has a pinion 18 gearing with a rack 19, attached to the lower cross-head 11, and hence assumes a position corresponding to the weight of the object whenever that object is placed upon the platform.

20 is a floating rack engaged by a pinion 21 on the center arbor 16 and engaging a pinion 22 on an upper arbor 23, said rack having a twofold object, first, to relieve the hand-returning weight, and, second, to hold and release the hand-locking toothed wheel, as will more fully appear.

Loose on the center arbor 16 is the hand-locking wheel 24, having teeth 25 of a number bearing a predetermined relation to the weight graduations in the indicating-dial, there being, as herein shown, one tooth and notch for every pound weight, although the divisions may be finer or coarser, if desired. 26 is a check-dog carried by a sliding plate 260, which is mounted to slide vertically on the plate 15 of the frame and is guided and held by a stud 261 and rear extension 262 of the dog, projecting through a slot 263, the dog being adapted to enter the notches of the toothed wheel 25 and hold the same from rotation when a weight is on the platform, the rear extension of this dog being engaged by a pin 28 on the face of the rack 20, whereby said dog is elevated out of engaging position when no weight is present.

Fixed to the center arbor 16 in front of locking-wheel 24 is a hand-controlling wheel 29, having a cylindrical flange 30 formed with a gap 31, on the remote side of which is a stop projection 32, having an inclined deflecting inner edge.

Fixed to the sleeve 17, which is loose on center arbor 16, is an indicator-hand 33, cooperating with a suitably-marked dial (not shown) to indicate the weights. Also fixed to said sleeve 17 is a counterweighted arm 34, having a rearwardly-projecting pin 35, normally engaged by a trip-lever 36, which locks the hand in zero position. The heel-piece of this lever is engaged by a pin 37 on a rod 38, carrying at its lower end a shelf 39, located beneath the end of the coin-chute 40, whereby the lever 36 is tripped and the hand released when the coin is deposited. A spring 41 reëlevates the rod 38.

Pivoted at 42 on the arm 34 is a three-arm lever 43, carrying on its inner arm a pin 44, which coöperates with the flanged wheel 29, and on a second arm a pawl projection 45, coöperating with the teeth 25 of wheel 24. A third outwardly-projecting arm is adapted to coöperate with a fixed stop-pin 46, as hereinafter set forth. A spring 146, connecting the lever 43 with arm 34, tends to move said lever counter-clockwise.

As a means for moving the hand 33 on its outward and return strokes I have shown two weights mounted in tubular guides 47 48. The weight 49, which is the lighter, has fixed to it a rack 50, gearing with a pinion 51 on the sleeve 17. The heavier weight 52 has two parallel racks 53 54. The rack 53 meshes with the pinion 51 on the opposite side from rack 50 and is designed to communicate the influence of weight 52 to the hand 33 for the purpose of returning the latter to zero position when it is free to return. This rack has a hook 55 on its lower end engaging a cross-piece 56 on the weight 52. The second rack 54 is designed to disconnect the weight 52 from the hand when a weight is on the platform, and for this purpose it has at its lower end a hook 57, engaging a cross-piece 58 on the weight, while the teeth on its upper end mesh with the teeth of a pinion 59 on shaft 23.

60 60 are adjustable stops or rests which limit the upward movement of the cross-head 11 and accordingly determine the normal position of rest assumed by the gap 31 in the flange of wheel 29.

The operation is as follows: Fig. 1 shows the normal position of parts when no weight is on the platform. In this condition the hand is locked at zero by the engagement of trip-lever 36 with pin 35 on the arm 34. The pin 44 on lever 43 is just outside of the flange 30 and opposite gap 31. The hand-locking wheel 24 is released from dog 26, as seen in Fig. 2. When a person or other weight is placed upon the platform, the motion is communicated from the platform through rod 10 to the cross-head 11, and the weighing-springs 12 are distended, the cross-head assuming a certain predetermined position corresponding to the weight. This motion is carried through rack 19, pinion 18, and the center arbor 16 to the flanged wheel 29, and said wheel rotates clockwise until its gap 31 reaches a position corresponding to the weight. This position of the parts when weighing has been performed, but the weight has not been indicated, is shown in Fig. 7. When a coin or other check is deposited in the slot at the upper end of chute 40, the consequent tripping of lever 36 through the medium of parts 39 38 37 releases the arm 34 and hand 33 and the latter rotates clockwise under the influence of weight 49. Weight 49 is free to act at this time on the hand 33 because of the fact that the superior weight 52 has been relieved from engagement with the rack 53 by being lifted through the medium of rack 54 and pinion 59, connected with the weighing mechanism. This lifting of the rack 54 is brought about by the descent of rack 20, which at the same time allows the dog 26 to descend by gravity and lock the toothed wheel 24 against rotary movement. As the pin 44 revolves around wheel 29 it rests on the outside of flange 30. As soon as said pin has reached a position corresponding to the distance previously traveled by the gap 31 it escapes through said gap by the action of the spring 146. Should this spring be omitted, the inclined inner face of stop projection 32 would deflect the pin through the gap. The inward movement of the pin through the gap allows the pawl projection 45 to engage the nearest notch in the toothed wheel 24 and locks the hand 33 positively against rotation in either direction. It will be observed that the hand is arrested not by the weighing mechanism itself, but by being locked to a fixed member through a tripping action effected by said weighing mechanism. When the pin 44 is within the flange 30, it is free from the weighing mechanism, and no jouncing on the platform will disturb the position of the hand. As soon as the weight is removed from the platform the flanged wheel 29 returns to original position, as shown in Fig. 9, the rack 54 allows the weight 52 to return into engagement with rack 53, the dog 26 is lifted out of engagement with the teeth of wheel 24 by the pin 28 on rack 20, and the weight 52 returns arm 34, lever 43, and hand 33 to their original positions. The lever 43 is still locked with the wheel 24 during this return, and consequently the latter rotates backward. When the pin 44 reaches a position opposite gap 31, it is thrown out through said gap by the action of stationary pin 46 on lever 43, which releases the pawl projection 45 from the toothed wheel 24. At the same time the arm 34 encounters lever 46 and its pin 35 is engaged and locked by the coin-actuated trip-lever 36. At no time can a person obtain a fresh weight by substitution on the platform, because until the old weight is off the platform and permits the unlocking of the toothed wheel the indicator-hand remains locked and will not again give an accurate indication until fully restored to its initial position and locked by the coin-trip.

The lower end of the guide-tube 47 of weight 49 is closed so as to constitute said tube a dash-pot, which retards the outward movement of the hand 33.

I claim—

1. In a coin-controlled weighing-machine, the combination of weighing mechanism, a weight-indicator normally disconnected from said mechanism, coin-controlled means for moving said indicator, and locking means arranged for operation by the weighing mechanism to lock the indicator in weight-indicating position.

2. In a coin-controlled weighing-machine, the combination of a coin-controlled indicator, an indicator-locking member, a weight-receiving support, and means operated positively by said support arranged to cause said locking member to lock the indicator in weight-indicating position when a weight is present.

3. In a coin-controlled weighing-machine, the combination of a coin-controlled indicator, a locking device connected to said indicator and movable therewith, and platform-actuated means for making operative said locking device.

4. In a coin-controlled weighing-machine, the combination of a coin-controlled indicator, a locking device carried therewith, and platform-actuated means free from the indicator on both outward and return movements of the latter for tripping said locking device to lock said indicator.

5. In a coin-controlled weighing-machine, the combination of a coin-controlled indicator, a normally free indicator-locking wheel rotatable independently of the indicator and having locking-divisions corresponding to weight-divisions, and platform-actuated means for locking said wheel when a weight is present.

6. In a coin-controlled weighing-machine, the combination of a coin-controlled indicator, a locking device carried therewith, a normally free locking-wheel to coöperate with said device, and weighing mechanism having means for locking said wheel.

7. In a coin-controlled weighing-machine, the combination of a coin-controlled indicator, a locking device carried therewith, and weighing mechanism including a wheel having a concentric flange arranged to maintain said locking device inoperative and provided with a terminal portion for tripping said locking device to lock the indicator.

8. In a coin-controlled weighing-machine, the combination of a coin-controlled indicator, a locking member, a revolving locking-lever carried with said indicator having a pin adapted to engage said locking member to lock the lever, weighing mechanism including a wheel provided with a flange concentric with the axis of revolution of the locking-lever for controlling said lever and having a gap, and a projection on the lever adapted to rest on said flange for preventing the locking action of the lever and to escape through said gap to permit such locking action.

9. In a coin-controlled weighing-machine, the combination of a coin-controlled indicator, a locking device carried therewith, a coöperating normally free locking member, and weighing mechanism including means for tripping said locking device, and means for holding said locking member when a weight is present.

10. In a coin-controlled weighing-machine, the combination of a rotary coin-controlled indicator, a pivoted locking-lever carried therewith and having a trip projection and a locking projection, a platform-actuated wheel concentric with the indicator and having a flange coöperating with the trip projection and provided with a gap, a locking-wheel concentric with the indicator and having teeth corresponding to the wheel divisions for coöperation with the locking projection, and platform-actuated means for locking said toothed wheel when a weight is present.

11. In a coin-controlled weighing-machine, the combination of normally free weighing mechanism, a coin-controlled vibrating indicator coöperating therewith, means independent of the weighing mechanism for imparting outward movement to said indicator, and means rendered inoperative while the weighing mechanism is distorted for independently returning said indicator after return of the weighing mechanism to normal position.

12. In a coin-controlled weighing-machine, the combination of weighing mechanism, yieldingly and oppositely acting devices for imparting outward and return movements to said indicator, the device for imparting outward movement to the indicator being wholly independent of the weighing mechanism, and means actuated by the weighing mechanism for disabling the return-producing device previously to and during the outward movement of the indicator.

13. In a coin-controlled weighing-machine, the combination of weighing mechanism, a vibrating coin-controlled indicator coöperating therewith, a weight for producing outward movement of said indicator, a greater weight for producing the return movement thereof, and means actuated by said weighing mechanism for relieving the indicator of the said greater weight when a weight is present on the platform.

14. In a coin-controlled weighing-machine, the combination of weighing mechanism, a vibrating coin-controlled indicator free therefrom on both outward and return movements, means for locking said indicator, a tripping member operated by the weighing mechanism for tripping said means to lock the indicator, means independent of the weighing mechanism for imparting outward movement to the indicator, and separate means under the control of said mechanism for returning said indicator.

In testimony whereof I have affixed my signature in presence of two witnesses.

CORNELIUS J. HARRINGTON.

Witnesses:
R. M. PIERSON,
A. C. RATIGAN.